United States Patent [19]

Ljungqvist

[11] Patent Number: 5,438,043
[45] Date of Patent: Aug. 1, 1995

[54] BEVERAGE FOR PREOPERATIVE INTAKE

[75] Inventor: Olle Ljungqvist, Stockholm, Sweden

[73] Assignee: Olle Ljungqvist Medical AB, Bromma, Sweden

[21] Appl. No.: 81,334

[22] PCT Filed: Dec. 20, 1991

[86] PCT No.: PCT/SE91/00897
§ 371 Date: Jun. 21, 1993
§ 102(e) Date: Jun. 21, 1993

[87] PCT Pub. No.: WO92/10947
PCT Pub. Date: Jul. 9, 1992

[30] Foreign Application Priority Data

Dec. 21, 1990 [SE] Sweden ................. 9004131

[51] Int. Cl.⁶ ................. A61K 31/70; A61K 31/715
[52] U.S. Cl. ................. 514/23; 514/53; 514/54
[58] Field of Search ................. 514/23, 53, 54, 58, 514/60

[56] References Cited

U.S. PATENT DOCUMENTS

| | | | |
|---|---|---|---|
| 4,303,684 | 12/1981 | Pitchon et al. | 426/312 |
| 4,734,402 | 3/1988 | Hashimoto et al. | 514/54 |
| 5,032,411 | 7/1991 | Stray-Gundersen | 426/74 |

FOREIGN PATENT DOCUMENTS 0364053  4/1990  European Pat. Off. .
WO-A1-9002494  3/1990  WIPO .
WO-A1-9118610  12/1991  WIPO .

*Primary Examiner*—Raymond Henley, III
*Attorney, Agent, or Firm*—Darby & Darby

[57] ABSTRACT

A beverage for preoperative use is disclosed, which comprises essentially of a hypotonic aqueous solution of a carbohydrate mixture consisting of at least one member from each of the groups mono-, di-, and polysaccharides in an amount of 8–20, preferably 9–15 g carbohydrates/100 ml solution. The invention also relates to a hypotonic aqueous solution as defined above for the use as a beverage for preoperative intake, to the use of mono-, di- and polysaccharides for the preparation of such a hypotonic aqueous solution and to the use of a dry substance comprising essentially A) a carbohydrate mixture consisting of 10–30% by weight of at least one monosaccharide, 10–30% by weight of at least one disaccharide and at least one polysaccharide as the balance to 100% by weight of said mixture and B) minor amounts of salts, flavoring and preservatives for the preparation of a hypotonic beverage for preoperative intake. Finally there is also disclosed a method for suppressing the negative influence on patient carbohydrate metabolism after surgery, and improving the defence capacity of the patient upon bleeding in connection with or after the operation, which method comprises preoperative oral administration to the patient an effective amount of a hypotonic aqueous solution as defined above.

7 Claims, No Drawings

BEVERAGE FOR PREOPERATIVE INTAKE

This application is a 371 of PCT/SE91/00897, filed Dec. 20, 1991.

The present invention relates to a beverage intended for use before elective surgery, and the use of a solution of carbohydrates as such a beverage, and the use of carbohydrates or a carbohydrate mixture for the preparation of such a beverage.

Approximately 2–300 000 elective (i.e. not emergency) surgical operations under general anaesthesia are performed annually in Sweden alone. A routine operation always brings about a relatively long period (weeks) of convalescence for physical recovery. Routinely, elective surgery is performed after a fasting period beginning at midnight to the day of the operation. The effective fasting period, however, lasts at least 16–18 hours, since the last meal on the day before surgery is served around 16.00 h. The obligatory fast before surgery has been introduced for reasons of safety in connection with anaesthesia, primarily in order to prevent the regurgitation of acid stomach content into the lungs, and has not been considered to bring about any negative effects for the patient.

However, a considerable change in the metabolism occurs already during brief fasting, such as the preoperative fasting period. The most important alteration is the consumption of the carbohydrate reserves of the body (primarily in form of glucose stored as glycogen in the liver). The requirements of the brain for glucose, however, remains unchanged during the first few days of fasting. In order to satisfy this requirement during fasting, body metabolism is changed so that new glucose can be produced. This is accomplished by the degradation of carbohydrate reserves outside the liver (mainly muscle), breakdown of proteins in muscle to amino acids, mainly alanine and glutamine, as well as fat degradation. The released substances are transported to the liver for new glucose formation. In order to enable the degradation of energy depots, the hormonal release is changed and thereby body metabolism is changed from anabolism (augmenting energy loading and new tissue building) into a state of catabolism (energy and tissue breakdown). This shift in metabolism constitutes a normal part of body metabolism, and is present after for example an over night sleep with fasting. When the first meal is consumed in the morning, the body responds with release of other hormones, primarily insulin, which augments the storage of carbohydrates, proteins and fat.

Thus, even a brief fast, such as preoperative fasting, leads to two essential changes in body metabolism. Both can be closely related to the metabolism of carbohydrates:

1. Consumption of glucose reserves.
2. Change in body metabolism

These changes in metabolism has important consequences for the responses to physical stress and trauma, as well as for the recovery after stress and surgery.

It has been shown that exhaustion of the carbohydrate reserves (glycogen) in the liver, which occurs already after brief fasting (5–24 h in the rat and in man), has been shown to significantly increase mortality after experimental hemorrhage and endotoxemia. During hemorrhage, it has been proven that the glycogen reserve is rapidly released as glucose to the circulation, where increased glucose levels was registered. This increase in blood glucose causes fluid mobilization from the greater reserves of fluid in the body located inside the cells, into the circulation. The development of increasing blood glucose levels thereby constitutes an important part of the body's own defence during bleeding, and this potential is markedly reduced after already a brief period of fasting. This mechanism exists in the majority of mammals including man. In accordance, the preoperative fasting period reduces the availability of glucose in the body, and thus causes a considerable reduction in this part of blood volume defence in case of hemorrhage during of after surgery.

In all types of physical trauma (of which elective surgery is perhaps the greatest in terms of volume) body metabolism is rapidly changed. The normal balance between anabolism and catabolism is markedly displaced towards catabolism. Of cardinal importance for this change to develop, is the reduced effectiveness of the body's major anabolic hormone insulin. The normal nutrient storing effects of this hormone is markedly reduced, and a state of insulin resistance is developed. It has been shown that the degree of insulin resistance developing after surgery is related to the magnitude of the operation performed (i.e. greater surgery leads to greater insulin resistance). In addition, the normalization of insulin action has been shown to take approximately three weeks after routine abdominal surgery. As long as this resistance remains, the body has difficulties in recovering. Therefore it is desirable to reduce this development and to achieve a normal balance in metabolism as quickly as possible after surgery.

The present invention is based on the finding that by preoperative administration of a solution containing glucose, not only was the defense in case of bleeding improved, but also was a significant reduction (approximately 50%) in post operative development of insulin resistance achieved. The present invention is thus based on the fact that preoperative glucose administration improves post operative metabolism.

To avoid fluid accumulation in the stomach upon drinking, the beverage given must be specifically adjusted. Thus, hypo-osmolar solutions have previously been shown to stimulate gastric emptying, while hyperosmolar solutions have the reverse effect. Hence, any fluid given shortly before surgery must be hypo-osmolar, preferably below 295 mosm/kg. In addition, to reach maximum effect for fluid defence in case of hemorrhage as well as reaching maximum metabolic effect, a maximum of carbohydrates should be administrated. To accomplish this, the carbohydrates should be adjusted accordingly by appropriate mixture of mono-, di- and poly- saccharides. In addition, by adjusting the pH of the beverage above that of stomach fluids, the pH of the stomach content can be elevated. This is also of importance in case of regurgitation of stomach content during anaesthesia.

More particularly, the present invention is based on the following findings:

A. Animal experiments

Survival after a 42% blood loss was studied in twenty rats fasted for 24 h. As fasting started, all animals were allowed free access to water until 17.00 h the day before hemorrhage. From this time until 8.00 h on the day of experiment water was withheld. The rats were randomly divided into two groups drinking either 7–11 ml of tap water or approximately the same volume of hypo-osmolar fluid, rich in carbohydrates (for details see Example 1 below). After drinking this fluid volume, the animals were subjected to 42% blood loss in a standardized manner. All but one animal (n=5) receiving water died within 3 h of completion of hemorrhage, while 8/9 rats given carbohydrates recovered completely during the seven day observation period, difference between groups, p<0.05, Fisher's exact test.

These experiments are in agreement with other experiments were approximately the same amount of carbohydrates were infused intravenously prior to hemorrhage. Infusion of saline resulted in 100% mortality in ten rats, while another ten given glucose all survived. In parallel experiments six rats in each group were sacrificed immediately prior to hemorrhage for analysis. Liver glycogen content in glucose infused rats was 578±72 μmol/g dry liver wt compared to 104 μmol/g dry liver wt in the other group, difference significant, p<0.01 (Mann Whitney U-test). During hemorrhage, glucose treated rats developed blood glucose levels of 16.1±0.9 mmol/l compared to saline treated 5.2±0.1 mmol/l, p<0.01. This increase in blood glucose resulted in improved fluid movement into the circulation, as indicated by the lower hematocrits in glucose treated rats 35±1% vs 40±1% in saline treated, p<0.01.

The hormone response to hemorrhage was investigated in two groups of rats fasted for 24 h before hemorrhage. The groups were pretreated according to the above protocol. Pretreatment with glucose resulted in a hormone pattern with increased insulin levels in a way which has previously been described only in rats subjected to hemorrhage in the fed state. This insulin response was not present in saline treated rats, and has previously been shown not to develop if glucose treatment is commenced once the bleeding has started. This finding indicates that important parts of the effects of glucose administration can only be achieved if treatment is given prior to the onset of stress.

With greater glucose release and higher blood glucose levels during hemorrhage, fluid movement is improved during blood loss. This in turn has direct effects on survival after hemorrhage. In a series of experiments in 24 h fasted rats (8-10 in each group), this finding was confirmed by infusions of glucose solutions of various concentrations during the course of hemorrhage. The concentrations were 0%, 5%, 10%, 20% and 30%. With increasing glucose concentration given, blood glucose developments increased. This in turn resulted in a stepwise improvement of fluid movement into the circulation, and ultimately recovery after hemorrhage. Thus, survival with a 0% solution was 12.5%, 5% was 33.3%, 10% was 58.3%, 20% was 66.7% and 30% was 75%. This finding illustrates that the possibility to develop increasing glucose levels in blood during hemorrhage is an important determinant for survival after hemorrhage.

B Clinical experiments

In 12 patients, healthy apart from gallstone and operated for cholecystectomy, were randomly allocated into receiving either glucose 5 mg/kg/min intravenously from 18.00 h the day before surgery, until start of the operation, or no infusion during this period (e.g. routine per-operative fasting period). Insulin sensitivity (m-value) was determined using the euglycemic hyperinsulinemic clamp technique within 3 days prior to surgery, and on the first post-operative day. The pre-operative M-values were similar in both groups (n=6); 4.64±1.36 mg glucose/kg/min in glucose treated patients and 4.31±0-35 mg/kg/min in fasted patients, difference not significant. Post-operative M-value was significantly lower (p<0.02) in fasted patients (2.00±0.21 mg/kg/min) compared to patients pre-treated with glucose (3.14±0.88 mg/kg/min). This finding shows that pre-treatment with glucose during pre-operative fasting significantly reduces the post operative disturbance in body metabolism by reducing the development of post-operative insulin resistance.

In another study, patients operated for gallstone disease were pre-treated with either glucose infusion (5 mg/kg/min) or traditional fasting before the same operation. During the operation, small pieces of tissue were sampled from the liver for the analysis of the content of glycogen (e.g. glucose polymers) as well as the activity of enzymes involved in the control of the hepatic metabolism of carbohydrates. Patients treated with glucose had higher content of glycogen, and the enzymatic setting was adjusted in a way which is more associated with that seen after meal intake (than that seen after fasting), compared to the patients fasted before surgery. This difference in hepatic enzymatic adjustment has experimentally been shown to be associated with marked differences in post-stress metabolism. Enzymatic adjustment, such as that found after food intake was associated with improved post-stress metabolism.

In accordance with the above, the present invention involves a beverage specifically designed for pre-operative use. The beverage contains a mixture of mono-, di-, and polysaccharides. The purpose of pre-operative carbohydrate supplementation is, such has been described above, to increase the carbohydrate reserves in the body and simultaneously adjust body metabolism towards a more anabolic setting by the time of surgery. Treatment accomplishing these effects have been shown to markedly reduce the level of disturbance in body metabolism caused by surgical operations and improve organ function after surgery. By the intake of carbohydrates in larger amounts, a shift in body metabolism is accomplished, whereby the metabolism of the body is shifted towards anabolism and substrate loading, which in turn, has been shown to be closely associated with improved responses to physical stress and surgery. By oral intake of carbohydrates, the storage of carbohydrates into the liver is improved compared to intravenous supplementation. The amount of glycogen in the liver has been shown to be one important determinant of the capability for defence during stress. By careful adjustment of the different carbohydrate components used in the beverage, the beverage may be given orally without increased risk during anaesthesia and surgery. The beverage is to be consumed during the evening before surgery and/or 30 min–4 h, preferably 1–3 h before start of the operation.

The beverage according to the present invention is characterized in that it comprises essentially a hypotonic aqueous solution of a carbohydrate mixture consisting of at least one member from each of the groups mono-, di-, and polysaccharides in an amount of 8–20, preferably 9–15 g carbohydrates/100 ml solution.

According to a preferred embodiment of the beverage according to the invention, the composition of the carbohydrates is 10–30, preferably 12–21 per cent of at least one monosaccharide, 10–30, preferably 20–25 per cent by weight of at least one disaccharide and at least one polysaccharide as the balance to 100 per cent by weight calculated on the weight of the mixture. The mutual weight ratios between mono-, di-, and poly-saccharides are adjusted to render the aqueous solution hypotonic.

Examples of monosaccharides to be contained in the mixture of carbohydrates are glucose and/or fructose.

Saccharose and/or maltose is/are used preferably used as the disaccharide(s). Examples of polysaccharides to be contained in the carbohydrate mixture are starch, maltodextrins and/or dextrins. The polysaccharide or polysaccharides should, of course, be soluble in water and be physiologically innocuous.

The beverage according to the invention should suitably have an osmolality of 250-295 mosm/kg, preferably 280-290 mosm/kg.

In addition to the carbohydrate mixture, the beverage can, according to the invention, contain salts, flavoring, and preservatives. As salts in this connection, sodium chloride and/or potassium chloride may be mentioned. The amount of salt is usually below 200 mg/100 ml solution, preferably 80 mg/100 ml solution.

The beverage is produced and packed in volumes of 100 ml-500 ml. Different pack sizes of the beverage is produced to adjust the fluid intake for patients of varying weights. In addition, a larger volume should be given during the evening before the operation, and a smaller volume 30 min-4 h, preferably 1-3 h prior to start of surgery. The former is given to increase the supply of carbohydrates, while the latter, apart from this, also will trigger a hormonal response in the body, thereby adjusting the patients metabolism into a more anabolic setting. The mixture of carbohydrates may also be produced as a dry substance, and packed in suitable sterile bags to be solved in water immediately before use.

The invention also relates to a hypotonic aqueous solution of a carbohydrate mixture consisting of at least one member from each of the groups mono-, di- and poly-saccharides in an amount of 8-20, preferably 9-15 g carbohydrates/100 ml solution for use as a beverage for preoperative intake. Said hypotonic aqueous solution, in addition to the carbohydrate mixture, preferably contains minor amounts of salts, flavoring and preservatives.

The invention further relates to the use of a dry substance comprising essentially A) a carbohydrate mixture consisting of 10-30, preferably 12-21 per cent by weight of at least one monosaccharide, 10-30, preferably 20-25 per cent by weight of at least one disaccharide, and at least one polysaccharide as the balance to 100 per cent by weight calculated on the weight of the carbohydrate mixture and B) minor amounts of salts, flavoring and preservatives for the preparation of a hypotonic beverage for preoperative intake.

The invention also relates to the use of carbohydrates selected from the groups mono-, di- and poly-saccharides for the preparation of a hypotonic aqueous solution of at least one member of each of said groups for preoperative intake, which solution comprises 8-20, preferably 9-15 g carbohydrates/100 ml solution.

The invention also relates to a method for suppressing the negative influence of an operation on carbohydrate metabolism of the patient after surgery and improving the defense capacity of the patient upon bleeding in connection with or after the operation, which method comprises preoperative oral administration to the patient of an effective amount of a hypotonic aqueous solution of a carbohydrate mixture consisting of at least one member from each of groups mono-, di- and poly-saccharides in an amount of 8-20, preferably 9-15 g carbohydrates/100 ml solution.

The invention is further illustrated by the following examples, to which however, the invention should not be limited. These examples represent the best mode contemplated at present for carrying out the invention.

EXAMPLE 1

A beverage is produced using conventional methods, containing a total of 10 g carbohydrates, of which 5.5 g are dextrin (polysaccharide, Dextrin type 1: from corn (9004-53-9), Sigma Chemicals, St Louis, USA), 2.5 g maltose (disaccharide) and 2.0 g glucose (monosaccharide), with 0.075 g NaCl per 100 ml solution with an osmolality of approximately 280 mosm/kg and the pH is 6.2, with the addition of NaOH 1M 0.02 ml per 100 ml solution. The beverage is packed to a volume of 400 ml. The beverage is intended to be consumed by a person weighing 70 kg, approximately 3-4 h prior to start of surgery.

EXAMPLE 2

A beverage is produced by conventional methods to contain 14.7 g carbohydrates/100 ml solution. The mixture of carbohydrates contains 11.7 g dextrin (polysaccharide, Dextrin type 1: from corn (9004-53-9), Sigma Chemicals, St Louis, USA.), 1.5 g maltose (disaccharide) and 1.5 g glucose (monosaccharide), and 0.075 g NaCl is added. The osmolality of the beverage is approximately 255 mosm/kg, and the pH 6.0, adjusted with the addition of 1M NaOH 0.026 ml/100 ml solution. The beverage is packed into two volume sizes, 500 ml and 100 ml. The larger volume is intended for a patient weighing 75 kg, to be consumed during the evening prior to operation, and the smaller volume approximately 2-3 h prior to the operation.

EXAMPLE 3

A dry substance of carbohydrates is produced by conventional mixing means, containing 14.7 g carbohydrates. The mixture of carbohydrates contains 11.7 g dextrin (polysaccharide, Dextrin type 1: from corn (9004-53-9), Sigma Chemicals. St Louis, USA), 1.5 g maltose (disaccharide) and 1.5 g glucose (monosaccharide), and 0.075 g NaCl is added. To adjust the pH of the final solution NaOH 1M 0.04 ml is added to the dry substance, which is then dried. The dry substance is intended to be dissolved to yield 100 ml solution with an osmolality of 285 mosm/g and pH 6.0. The beverage is intended to be consumed approximately 3 h prior to the operation, by a person weighing 70-75 kg.

I claim:

1. A method for suppressing insulin resistance resulting from surgical operation, and increasing available carbohydrate reserves during or after surgery, which method comprises oral administration within about four hours prior to surgical operation to a patient of an effective amount of a hypotonic aqueous solution of between 8 and 20 grams of a carbohydrate mixture per 100 ml, said carbohydrate mixture a monosaccharide, a disaccharide and a polysaccharide.

2. The method of claim 1, wherein said mixture includes between 10 and 30 percent by weight monosaccharide; between 10 and 30 percent by weight disaccharide; and balance polysaccharide.

3. The method of claim 1 further comprising an additive selected from the group consisting of salts, flavorings, preservatives and mixtures thereof.

4. The method of claim 1, wherein said solution includes from between 9 and 15 grams of said mixture per 100 ml.

5. The method of claim 1, wherein said osmolality is between 250 and 295 mosm/kg.

6. The method of claim 1, wherein the pH is between 5.6 and 6.8.

7. The method of claim 5, wherein said osmolality is between 280 and 290 mosm/kg.

* * * * *